(12) United States Patent
Sasabayashi et al.

(10) Patent No.: US 7,911,764 B2
(45) Date of Patent: Mar. 22, 2011

(54) DIELECTRIC CERAMICS, AND LAMINATED CERAMIC CAPACITOR

(75) Inventors: Takehisa Sasabayashi, Echizen (JP); Tomoyuki Nakamura, Moriyama (JP); Masayuki Ishihara, Yasu (JP); Takayuki Yao, Higashiomi (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 12/723,942

(22) Filed: Mar. 15, 2010

(65) Prior Publication Data

US 2010/0165541 A1 Jul. 1, 2010

Related U.S. Application Data

(63) Continuation of application No. PCT/JP2008/063587, filed on Jul. 29, 2008.

(30) Foreign Application Priority Data

Sep. 19, 2007 (JP) .................................. 2007-242206

(51) Int. Cl.
*H01G 4/06* (2006.01)
*C04B 35/00* (2006.01)

(52) U.S. Cl. .................... 361/321.4; 361/321.2; 501/136

(58) Field of Classification Search .... 361/321.1–321.5, 361/320; 501/135–138
See application file for complete search history.

(56) References Cited

U.S. PATENT DOCUMENTS

| 7,397,649 B2 * | 7/2008 | Muto et al. ................. 361/321.4 |
| 7,595,975 B2 * | 9/2009 | Suzuki et al. ............... 361/321.4 |
| 7,691,286 B2 * | 4/2010 | Kawada et al. ............ 252/62.9 R |
| 2004/0145856 A1 | 7/2004 | Nakamura et al. |
| 2008/0061263 A1 * | 3/2008 | Kawada et al. ........ 252/62.9 PZ |
| 2008/0112109 A1 | 5/2008 | Muto et al. |
| 2008/0204187 A1 * | 8/2008 | Kishimoto et al. ....... 338/22 SD |
| 2010/0102679 A1 * | 4/2010 | Kawada ........................ 310/363 |

FOREIGN PATENT DOCUMENTS

| JP | 2002-020165 A | 1/2002 |
| JP | 2004224653 A | 8/2004 |
| WO | WO-2006132086 A1 | 12/2006 |

OTHER PUBLICATIONS

Written Opinion of the International Searching Authority, mailed Sep. 9, 2008.

* cited by examiner

*Primary Examiner* — Eric Thomas
(74) *Attorney, Agent, or Firm* — Dickstein Shapiro LLP (57) ABSTRACT

A dielectric ceramic contains a $BaTiO_3$-based compound as a main ingredient, and can be represented by the general formula: $100A_mBO_3+aNiO+bRO_n+cMO_v+dMgO+eXO_w$ where R represents a rare earth element such as Dy, M represents a metal element such as Mn, and X represents a sintering aid component containing Si. Ni is uniformly solid-solved in crystal grains, and the solid-solution region of the rare earth element in the crystal grains is an average 10% or less in terms of a cross section ratio. $0.96 \leq m \leq 1.030$, $0.05 \leq a \leq 3$, $0.1 \leq b \leq 1.5$, $0.1 \leq c \leq 1.0$, $0.1 \leq d \leq 1.5$, and $0.05 \leq e \leq 3.5$ are satisfied. A laminated ceramic capacitor has dielectric layers formed of the dielectric ceramic. As a result, a dielectric ceramic, and a laminated ceramic capacitor having excellent AC voltage characteristics, capable of keeping desired dielectric characteristics and excellent temperature characteristics, and having excellent withstand voltage and capable of ensuring reliability can be realized.

20 Claims, 1 Drawing Sheet

Fig. 1

DIELECTRIC CERAMICS, AND LAMINATED CERAMIC CAPACITOR

This is a continuation of application Serial Number PCT/JP2008/063587, filed Jul. 29, 2008, the contents of which are hereby incorporated by reference.

TECHNICAL FIELD

The present invention relates to a dielectric ceramic and a laminated ceramic capacitor, and more specifically, to a dielectric ceramic suited as a dielectric material of a laminated ceramic capacitor of small size and large capacity, and a laminated ceramic capacitor produced by using the dielectric ceramic.

BACKGROUND ART

A laminated ceramic capacitor is an electronic component that is used in the circuits of a wide variety of electronic devices, and downsizing of a laminated ceramic capacitor is necessary as such an electronic device is downsized.

Such a type of the laminated ceramic capacitor is formed by laminating dielectric layers interposed by internal electrodes, and sintering the laminate. For achieving downsizing of the laminated ceramic capacitor without causing reduction in its capacity, it is necessary to thin the dielectric layer.

However, when the dielectric layer is thinned, a high field voltage intensity is applied to the dielectric layer, so that a decrease in dielectric constant or a deterioration in temperature characteristics may be caused, or the insulation resistance may decrease as a result of long-time driving at a high temperature, to increase the possibility of occurrence of defective articles. This may result in deterioration in reliability.

Therefore, it is necessary to realize a dielectric ceramic having a large dielectric constant, excellent temperature characteristics and excellent reliability even if a high field voltage intensity is applied due to thinning of the dielectric layer.

In light of this, conventionally proposed is a dielectric ceramic having a composition containing a main ingredient composed of a perovskite-type compound represented by $ABO_3$ (wherein A represents Ba and Ca, or Ba, Ca and Sr, and B represents Ti, or Ti and at least one of Zr and Hf), and an additive component containing Si, a predetermined rare earth element R and a predetermined metal element M, and having crystal grains and crystal grain boundaries occupying intervals between the crystal grains, wherein the additive component is not solid-solved in a region of 90% or more of the cross section for 85% or more in the number of the crystal grains, the main ingredient is present, and at least said Ba, said Ca, said Ti, said Si, said R and said M are contained in 85% or more of analysis points in the crystal grain boundaries (Patent document 1).

In the Patent document 1 composition containing (Ba, Ca)TiO$_3$ as a main ingredient, and containing Si, a predetermined rare earth element R and a predetermined metal element M as accessory components, and making the accessory components be present in the crystal grain boundaries while they are only a little solid-solved with the main ingredient, a high temperature load life is ensured and thus reliability is improved.

Patent document 1: Japanese Unexamined Patent Publication No. 2004-224653

DISCLOSURE OF THE INVENTION

Problem to be Solved by the Invention

When the dielectric ceramic of Patent document 1 is used in a thin laminated ceramic capacitor, a problem arises in that the variation in capacitance with respect to the applied electric field is large.

To be more specific, an AC voltage of about 0.1 to 0.5V is generally applied to a laminated ceramic capacitor, but the amplitude of the AC voltage may vary depending on the usage situation. In particular, there arises a problem in association with the thinning of layers that variations in the applied electric field increases, and thus the capacitance largely varies, and the alternating current voltage characteristics (hereinafter, referred to as "AC voltage characteristics") deteriorate.

The present invention has been devised in consideration of such problems, and aims at providing a dielectric ceramic having improved AC voltage characteristics, and also aims at providing a dielectric ceramic having excellent AC voltage characteristics, capable of keeping desired dielectric characteristics and excellent temperature characteristics, having excellent withstand voltage and capable of ensuring reliability, and a laminated ceramic capacitor using such dielectric ceramic.

Means for Solving the Problem

In order to solve the problems, the dielectric ceramic of the present invention is characterized by having a composition containing a perovskite-type compound represented by a general formula $ABO_3$ (A contains Ba and may also contain at least one of Ca and Sr, and B contains Ti, and may also contain at least one of Zr and Hf) as a main ingredient, and a rare earth element R which is at least one selected from the group consisting of La, Ce, Pr, Nd, Sm, Eu, Gd, Tb, Dy, Ho, Er, Tm, Yb, Lu and Y, and Ni, and having crystal grains and crystal grain boundaries, wherein the Ni is uniformly or substantially uniformly solid-solved in the crystal grains, and the average solid-solution region of the rare earth element R in the crystal grains is 10% or less (including 0%) in terms of the cross section ratio.

The dielectric ceramic of the present invention is also characterized in that the composition is represented by a general formula: $100A_mBO_3+aNiO+bRO_n+cMO_v+dMgO+eXO_w$ (where M represents at least one metal element selected from the group consisting of Mn, Fe, Cu, Co, V, W, Cr, Mo and Al, and X represents a sintering aid component containing at least Si, n, v and w respectively represent positive numbers determined depending on valences of the rare earth element R, the metal element M, and the sintering aid component X), and the m, a, b, c, d and e satisfy $0.96 \leq m \leq 1.030$, $0.05 \leq a \leq 3$, $0.1 \leq b \leq 1.5$, $0.1 \leq c \leq 1.0$, $0.15 \leq d \leq 1.5$, and $0.05 \leq e \leq 3.5$, respectively.

Further, a laminated ceramic capacitor of the present invention is characterized by having a ceramic sintered body made up of dielectric layers and internal electrodes alternately stacked, external electrodes being formed on ends of the ceramic sintered body, and the external electrodes being electrically connected with the internal electrodes, wherein the dielectric layer is formed of the dielectric ceramic.

EFFECT OF THE INVENTION

In the dielectric ceramic of the present invention where the Ni is solid-solved in the crystal grains uniformly or substantially uniformly, and the average solid-solution region of the rare earth element R in the crystal grains is 10% or less (including 0%) in terms of the cross section ratio, the rare earth element R is prevented from being solid-solved in the crystal grains as a consequence of the Ni being solid-solved in the crystal grains uniformly or substantially uniformly, so that the AC voltage characteristics of capacitance can be improved.

Also, since the composition is represented by a general formula: $100A_mBO_3+aNiO+bRO_n+cMO_v+dMgO+eXO_w$, and the m, a, b, c, d and e satisfy $0.96 \leq m \leq 1.030$, $0.05 \leq a \leq 3$, $0.1 \leq b \leq 1.5$, $0.1 \leq c \leq 1.0$, $0.1 \leq d \leq 1.5$, and $0.05 \leq e \leq 3.5$, respectively, it is possible to obtain a dielectric ceramic having improved AC voltage characteristics while any of various characteristics such as dielectric characteristics, temperature characteristics, withstand voltage, reliability and the like are not impaired.

Even when a part of the Ba is replaced by at least one of Sr and Ca, and a part of the Ti is replaced by at least one of Zr and Hf, the aforementioned effect can be achieved.

Also, in the laminated ceramic capacitor of the present invention having a ceramic sintered body made up of a dielectric layers and an internal electrodes alternately stacked, external electrodes being formed on ends of the ceramic sintered body, and the external electrodes being electrically connected with the internal electrodes, the dielectric layer is formed of the dielectric ceramic, so that it is possible to obtain a laminated ceramic capacitor having a stable capacitance with respect to changes in AC voltage, capable of keeping a desired large dielectric constant and excellent temperature characteristics, having small dielectric loss and excellent withstand voltage, and capable of ensuring reliability.

Concretely, it is possible to obtain a laminated ceramic capacitor having a percentage change in capacitance by voltage at an effective voltage 0.1 Vrms relative to the effective voltage at 0.5 Vrms of within ±8%, a dielectric constant ∈ of 2800 or more, a percentage of change in capacitance at −55° C. to +105° C., based on capacitance at 25° C., of within ±22%, satisfying X6S characteristics of EIA standard, having an insulation breakage voltage of 100V or more, and excellent reliability as evidenced by no occurrence of defective article after a continuous operation at high temperature.

DESCRIPTION OF REFERENCE SYMBOLS 1a to 1g Dielectric layer
2a to 2f Internal electrode
3a, 3b External electrode
10 Ceramic sintered body

BEST MODE FOR CARRYING OUT THE INVENTION

Next, an embodiment of the present invention will be described in detail.

A dielectric ceramic according to the present invention has a composition containing a perovskite-type compound represented by $ABO_3$ (wherein A contains Ba, and may also contain at least one of Ca and Sr, and B is Ti and may also contain at least one of Zr and Hf) as a main ingredient, a rare earth element R which is at least one selected from La, Ce, Pr, Nd, Sm, Eu, Gd, Tb, Dy, Ho, Er, Tm, Yb, Lu and Y, and Ni, and has crystal grains and crystal grain boundaries.

Ni is solid-solved in the crystal grains uniformly or substantially uniformly (hereinafter, simply referred to as "uniform solid-solved"), and the average solid-solution region of the rare earth element R in the crystal grains is 10% or less (including 0%) in terms of the cross section ratio.

By containing the rare earth element R in the dielectric ceramic, it is possible to suppress the dielectric loss tan δ and to improve the durability under high temperature load, thereby contributing to improvement in reliability.

As the rare earth element R, at least one selected from the group consisting of La, Ce, Pr, Nd, Sm, Eu, Gd, Tb, Dy, Ho, Er, Tm, Yb, Lu and Y or combination thereof can be used.

However, measurement of the solid-solution region of the rare earth element R in the crystal grains in arbitrary plural cross section points revealed that deterioration in AC voltage characteristics becomes significant when the average solid solution in the crystal grains exceeds 10% in terms of the cross section ratio. In other words, it is considered that AC voltage characteristics can be improved by applying a ceramic texture wherein the solid-solution region in the crystal grains of the rare earth element R is an average of 10% or less.

In light of this, the present inventors focused on these points and made diligent efforts to find a way that the average solid solution of the rare earth element R in the crystal grains can be suppressed to 10% or less in terms of the cross section ratio by making Ni be uniformly solid-solved in the crystal grains.

While the AC voltage characteristics of capacitance can be improved in this manner, from the viewpoint of ensuring various characteristics, for example, dielectric characteristics such as a dielectric constant ∈ and dielectric loss tan δ, temperature characteristics of capacitance, withstand voltage and reliability, it is preferred to adjust the molar ratio m between perovskite site A and site B within an appropriate range and blend so that each component falls within an appropriate range while containing a sintering aid containing a metal element M, Mg and Si.

That is, the dielectric ceramic is preferably formed of a composition system represented by the following general formula (A). It is particularly preferred to blend the composition so that m, a, b, c, d and e satisfy the following numerical formulas (1) to (6).

$$0.96 \leq m \leq 1.030$$

$$0.05 \leq a \leq 3$$

$$0.1 \leq b \leq 1.5$$

$$0.1 \leq c \leq 1.0$$

$$0.1 \leq d \leq 1.5$$

$$0.05 \leq e \leq 3.5$$

Here, as the metal element M, one selected from the group consisting of Mn, Fe, Cu, Co, V, W, Cr, Mo and Al or combination thereof can be used.

As a component of site A in $A_mBO_3$, Ba is essentially contained, and preferably a part of Ba is replaced by at least either one of Ca and Sr as necessary. As a component of site B, Ti is essentially contained, and preferably a part of Ti is replaced by at least either one of Zr and Hf.

As a sintering aid component X, at least Si is contained, and Ti, Li, Na, B, K, Mg and the like can be appropriately and selectively used in addition to Si as necessary.

The symbol n is a positive number determined depending on the valence of the rare earth element R, and for example, when the rare earth element R is trivalent Dy, n is 3/2.

Likewise, the symbol v is a positive number determined depending on the valence of the metal element M, and for example, when the metal element M is bivalent, v is 1, and when the metal element M is pentavalent, v is 5/2. The symbol w is a positive number determined depending on the valence of the sintering aid component X, and e.g., when X is tetravalent Si, w is 2.

Next, the reason why setting m, a, b, c, d and e to satisfy the numerical formulas (1) to (6) is preferable will be described.

(1) m

The symbol m represents the molar ratio between site A and site B of the $BaTiO_3$-based compound which is a main ingredient, and is stoichiometrically 1.000, however, it is also preferred to adjust the molar ratio between site A compound and site B compound so that site A is excess or site B is excess as necessary.

However, when the molar ratio m is less than 0.96, the main ingredient composition site B is overly in excess, so that the rare earth element R becomes more likely to be solid-solved in the crystal grains. That is, even when Ni is uniformly solid-solved in the crystal grains, the solid solution of the rare earth element R into the crystal grains is promoted in this case, so that the solid-solution region of the rare earth element R in the crystal grains widens to exceed an average of 10% and the improvement in AC voltage characteristics of capacitance may not be achieved. Also the temperature characteristics of capacitance deteriorate, and a reduction in reliability may be caused. On the other hand, when the molar ratio m exceeds 1.030, the main ingredient composition site A is overly in excess, so that the dielectric constant ∈ may be deteriorated.

Therefore, the blending molar ratio n is preferably $0.96 \leq m \leq 1.030$.

(2) a

By making Ni be uniformly solid-solved in the crystal grains, it is possible to prevent the rare earth element R from being solid-solved in the crystal grains, and better AC voltage characteristics can be thus obtained.

However, when the content of Ni is less than 0.05 mol relative to 100 parts by mol of the main ingredient, the desired operation effect cannot be achieved even if Ni is solid-solved in the crystal grains. On the other hand, when the content of Ni is more than 3 parts by mol relative to 100 parts by mol of the main ingredient, the withstand voltage may decrease or reliability may deteriorate even if AC voltage characteristics of capacitance are excellent.

Therefore, the molar part a of Ni, relative to 100 parts by mol of the main ingredient is preferably $0.05 \leq a \leq 3$.

(3) b

By adding the rare earth element R to the main ingredient, it is possible to suppress the dielectric loss tan δ, as described above, and to contribute to an improvement in reliability. Also by suppressing solid solution into the crystal grains to an average 10% or less in terms of the cross section ratio, it is possible to improve AC voltage characteristics of capacitance.

However, when the molar amount of the rare earth element R is less than 0.1 parts by mol relative to 100 parts by mol of the main ingredient, the rare earth element R may diffuse in a wider region of the crystal grains at a dilute concentration. That is, as a result of diffusion of the rare earth element R into a wider region of the crystal grains, the solid-solution region exceeds the average of 10% in terms of the cross section ratio, and the improvement in AC voltage characteristics of capacitance may not be achieved. Also in this case, the dielectric loss tan δ increases, and a reduction in reliability may further be caused. On the other hand, when the molar amount of the rare earth element R exceeds 1.5 parts by mol relative to 100 parts by mol of the main ingredient, a decrease in dielectric constant ∈ may be caused, and the temperature characteristics of capacitance may be deteriorated.

Therefore, the molar part b of the rare earth element R relative to 100 parts by mol of the main ingredient is preferably $0.1 \leq b \leq 1.5$.

(4) c

Since various characteristics can be improved by adding the metal element M into the main ingredient, it is also preferred to contain an appropriate amount of metal the element M in the dielectric ceramic.

However, when the molar amount of the metal element M is less than 0.1 parts by mol relative to 100 parts by mol of the main ingredient, it is impossible to expect the desired effect of addition. On the other hand, when the molar amount of the metal element M exceeds 1.0 part by mol relative to 100 parts by mol of the main ingredient, a decrease in dielectric constant ∈ may be caused.

Therefore, the molar part c of the metal element M relative to 100 parts by mol of the main ingredient is preferably $0.1 \leq c \leq 1.0$.

(5) d

Since dielectric loss tan δ can be suppressed and withstand voltage and reliability can be improved by adding a Mg component into the main ingredient, it is also preferred to contain an appropriate amount of Mg separately from other metal element M into the dielectric ceramic.

However, when the molar amount of the Mg component is less than 0.1 parts by mol relative to 100 parts by mol of the main ingredient, the desired adding effect cannot be expected. On the other hand, when the molar amount of the Mg component exceeds 1.5 parts by mol relative to 100 parts by mol of the main ingredient, a decrease in dielectric constant ∈ and deterioration in temperature characteristics of capacitance may be caused.

Therefore, the molar part d of the Mg component relative to 100 parts by mol of the main ingredient is preferably $0.1 \leq d \leq 1.5$.

(6) e

By adding an appropriate amount of the sintering aid into the main ingredient, it is possible to improve the sinterability and to contribute to low temperature burning while improving various characteristics of the dielectric ceramic.

However, when the molar amount of the sintering aid component X is less than 0.05 parts by mol relative to 100 parts by mol of the main ingredient, it is impossible to improve the sinterability and to obtain a high dielectric constant. On the other hand, when the molar amount of the sintering aid component X exceeds 3.5 parts by mol relative to 100 parts by mol of the main ingredient, the rare earth element R is likely to be solid-solved in the crystal grains even if Ni is uniformly solid-solved in the crystal grains, and thus the AC voltage characteristics of capacitance cannot be improved and temperature characteristics of capacitance may be deteriorated.

Therefore, the molar part e of the sintering aid component X relative to 100 parts by mol of the main ingredient is preferably $0.05 \leq e \leq 3.5$.

By making the dielectric ceramic represented by the above general formula (A) satisfy the above numerical formulas (1) to (6), it is possible to obtain a dielectric ceramic having excellent AC voltage characteristics, keeping a desired large dielectric constant and excellent temperature characteristics, having small dielectric loss and excellent withstand voltage, and capable of ensuring reliability.

Next, a laminated ceramic capacitor produced by using the present dielectric ceramic will be described in detail.

Figure 1:
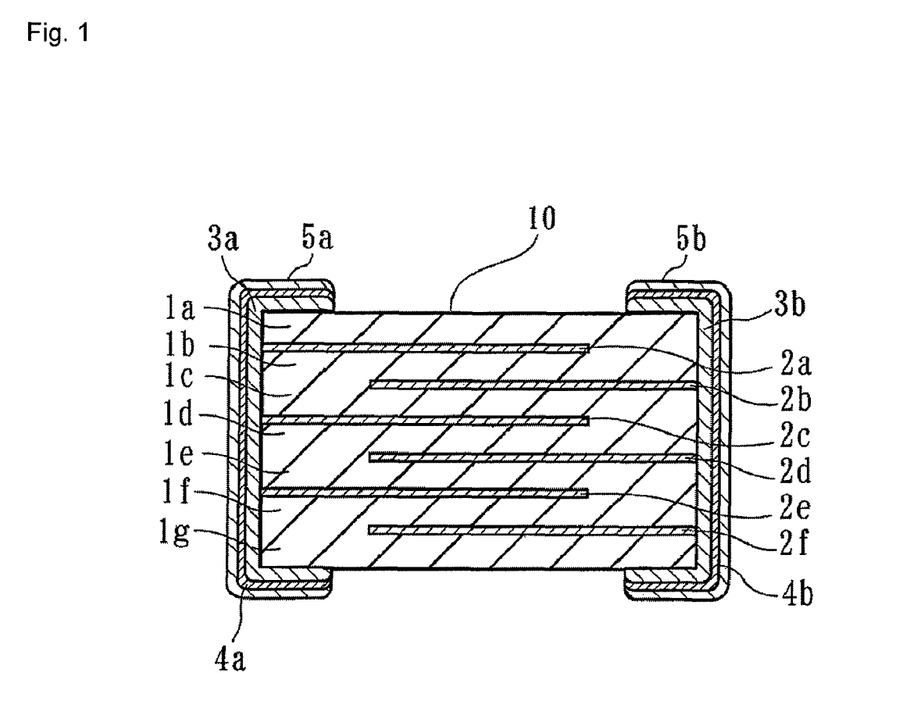
FIG. 1 is a section view showing one embodiment of a laminated ceramic capacitor produced by using a dielectric ceramic of the present invention.

FIG. 1 is a section view schematically showing one embodiment of the aforementioned laminated ceramic capacitor.

The laminated ceramic capacitor includes internal electrodes $2a$ to $2f$ embedded in a ceramic sintered body 10, external electrodes $3a$, $3b$ formed on both ends of the ceramic sintered body 10, and first plating films $4a$, $4b$ and second plating films $5a$, $5b$ formed on the surfaces of the external electrodes $3a$, $3b$.

To be more specific, the ceramic sintered body 10 is formed by sintering a laminate in which dielectric layers $1a$ to $1g$ formed of the dielectric ceramics and the internal electrode layers $2a$ to $2f$ which are alternately stacked, and the internal electrode layers $2a$, $2c$, $2e$ are electrically connected with the external electrode $3a$ and the internal electrode layers $2b$, $2d$, $2f$ are electrically connected with the external electrode $3b$. Capacitance is formed between opposite faces of the internal electrode layers $2a$, $2c$, $2e$ and the internal electrode layers $2b$, $2d$, $2f$.

Next, one example of a method of producing the laminated ceramic capacitor will be described in detail. First, as ceramic base materials, a site A compound such as $BaCO_3$, a site B compound such as $TiO_2$, and a Ni compound such as NiO are prepared.

Then predetermined amounts of the site A compound, the site B compound and the Ni compound are weighed.

The weighed materials are put into a ball mill together with balls such as PSZ (Partially Stabilized Zirconia) balls and pure water, wet mixed and ground well, and calcined at a temperature of 1000° C. or more to prepare a calcined powder composed of $\{100A_mBO_3+aNiO\}$ in which Ni is uniformly solid-solved in the crystal grains.

By mixing ceramic base materials constituting the main ingredient and NiO and combining them by calcining, it is possible to make the Ni component be easily solid-solved in the crystal grains.

Next, an R compound containing the rare earth element R, an M compound containing the metal element M, and a sintering aid containing at least Si are prepared, and predetermined amounts are weighed. Then these weighed materials are mixed with the calcined powder in a ball mill, and dried by evaporation to obtain a ceramic material powder.

Next, the ceramic material powder is put into a ball mill together with an organic binder and an organic solvent, and wet mixed to prepare a ceramic slurry, and then the ceramic slurry is subjected to a molding process by a lip method or the like to fabricate a ceramic green sheet.

Then using a conductive paste for internal electrode, screen printing is conducted on the ceramic green sheet to form a conductive film of a predetermined pattern on the surface of the ceramic green sheet.

As a conductive material contained in the conductive paste for internal electrode, a base metal material mainly composed of Ni, Cu or alloy thereof is preferably used from the viewpoint of cost reduction.

Next, a plurality of the ceramic green sheets on which the conductive film is formed are laminated in a predetermined direction, and they are sandwiched by ceramic green sheets on which the conductive film is not formed, bonded under pressure and cut into a predetermined dimension, and thus a ceramic laminate is fabricated. Then a binder removing treatment is conducted at a temperature of 300 to 500° C., and a burning treatment is conducted for about two hours under a reductive atmosphere of $H_2$—$N_2$—$H_2O$ gas whose oxygen partial pressure is controlled to $10^{-9}$ to $10^{-12}$ MPa at a temperature of 1100 to 1250° C. As a result, the conductive film and the ceramic green sheet are co-sintered, and the ceramic sintered body 10 in which the internal electrodes $2a$ to $2f$ and the dielectric layers $1a$ to $1g$ are alternately laminated is obtained.

In this manner of obtaining the ceramic material powder by mixing the calcined powder with the R compound or the like other additive while adjusting the burning temperature at a predetermined temperature within the aforementioned temperature range, it is possible to readily control the solid-solution region of the rare earth element R in the crystal grains, and thereby to readily suppress the solid-solution region to 10% or less in average in terms of the cross section ratio.

Next, a conductive paste for external electrode is applied on both end faces of the ceramic sintered body 10, and a baking treatment is conducted to form the external electrodes $3a$, $3b$.

Also as for the conductive material contained in the conductive paste for external electrode, it is preferred to use a base metal such as Cu from the viewpoint of cost reduction.

As a method of forming the external electrodes $3a$, $3b$, a burning treatment may be conducted concurrently with the ceramic laminate after applying the conductive paste for external electrode on both end faces of the ceramic laminate.

Finally, electrolytic plating is conducted to form the first plating films $4a$, $4b$ made of Ni or the like on the surfaces of the external electrodes $3a$, $3b$, and then the second plating films $5a$, $5b$ made of solder, tin or the like are formed on the surfaces of the first plating films $4a$, $4b$. In this manner, a laminated ceramic capacitor is produced.

As described above, since the present laminated ceramic capacitor is produced by using the dielectric ceramic for the dielectric layers $1a$ to $1g$, it is possible to ensure excellent AC voltage characteristics even if the dielectric layers $1a$ to $1g$ are thinned, and also it is possible to obtain a laminated ceramic capacitor having excellent high temperature load life and excellent reliability and having excellent withstand voltage without impairing dielectric characteristics and temperature characteristics.

Concretely, as to the AC voltage characteristics of capacitance, the percentage change in capacitance at an effective voltage 0.1 Vrms is within ±8% based on an effective voltage of 0.5 Vrms, and the dielectric constant is as high as 2800 or more. As to the temperature characteristics of capacitance, the percentage change in capacitance at −55 to +105° C. is within ±22% based on that at 25° C., and a laminated ceramic capacitor suited for thinning, having durability of 2000 hours or more at a high temperature of 105° C. and insulation breakdown voltage of 100 V or more can be obtained.

Furthermore, by making Ni solid-solved in $A_mBO_3$ which is a main ingredient at the time of preparation of the calcined powder in the present embodiment, it is possible to suppress the solid solution of the rare earth element R into the crystal grains without using a special production method and to readily produce the dielectric ceramic having a desired ceramic texture.

The present invention is not limited to the above embodiment. For example, while there is a fear that Zr, Zn, Ag, Na, Pd, Hf, Sr or the like can be present as impurities during the production process of the laminated ceramic capacitor, and thus exists in the crystal grains or in the crystal grain boundaries, this will not influence on electric characteristics of the laminated ceramic capacitor.

Further, while there is a fear that an internal electrode component can diffuse in the crystal grains or in the crystal grain boundaries during the burning treatment of the laminated ceramic capacitor, also in this case, no influence will be exerted on electric characteristics of the laminated ceramic capacitor.

The existing forms of the metal element M, the Mg component and the sintering aid on the dielectric ceramic are not particularly limited, and may be solid-solved in the crystal grains, or may exist in the crystal grain boundaries or at a crystal triple point.

While in the above embodiment, $A_mBO_3$ which is the main ingredient is prepared by a solid-state synthetic method using the site A compound and the site B compound as starting materials, it may be prepared by a hydrolysis method or a hydrothermal synthesis method, or a coprecipitation method. Furthermore, as to the site A compound and the site B compound, carbonates and oxides, nitrates, hydroxides, organic acid salts, alkoxides, chelate compounds and the like may be appropriately selected depending on the form of the synthesis method.

Next, examples of the present invention will be concretely described.

Example 1

Preparation of Sample

Sample No. 1

As ceramic base materials, $BaCO_3$, $TiO_2$, and NiO were prepared, and these ceramic base materials were weighed so that the blending ratio m between Ba and Ti was 1.010, and the molar part a of NiO relative to 100 parts by mol of $BaTiO_3$ was 1.0.

Next, these weighed materials were put into a ball mill together with PSZ balls and pure water, wet mixed and ground for 48 hours, and calcined at a temperature of 1100° C. to prepare a calcined powder.

Next, as additive materials, $Dy_2O_3$, $MnCO_3$, $MgCO_3$, and $SiO_2$ were prepared. Then these additive materials were weighed so that the dielectric ceramic satisfied the following general formula (B).

$$100Ba_{1.010}TiO_3+aNiO+1.0DyO_{3/2}+0.3MnO+1.0MgO+1.5SiO_2$$

These additive materials were put into a ball mill together with the calcined powder, wet mixed in the ball mill for 24 hours, and then dried by evaporation to obtain a ceramic material powder.

Then, to the ceramic material powder was added a polyvinyl butyral-based binder as an organic binder and ethanol as an organic solvent, and the mixture was put into a ball mill and wet mixed for a predetermined time to prepare a ceramic slurry. Next, the ceramic slurry was formed into a sheet using a doctor blade method to fabricate a ceramic green sheet.

Next a conductive paste for internal electrode composed mainly of Ni was prepared. Then the conductive paste for internal electrode was applied to the ceramic green sheet by screen printing to form a conductive film of a predetermined pattern on the surface of the ceramic green sheet.

Next, a plurality of the ceramic green sheets having the conductive film formed thereon were laminated in a predetermined direction, and they were sandwiched between ceramic green sheets not having the conductive film formed thereon, bonded under pressure, and cut into a predetermined dimension to fabricate a ceramic laminate. Thereafter, a binder removing treatment was conducted at a temperature of 300° C., and a burning treatment was conducted for about two hours under a reductive atmosphere of $H_2$—$N_2$—$H_2O$ gas whose oxygen partial pressure was controlled to $10^{-9}$ to $10^{-12}$ MPa at a temperature of 1220° C. As a result, a ceramic sintered body in which a dielectric layer and an internal electrode were alternately laminated was obtained.

Next, a conductive paste for external electrode composed mainly of Cu and containing a $B_2O_3$—$Li_2O$—$SiO_2$—BaO-based glass component was prepared. Then, to the both end faces of the ceramic sintered body, the conductive paste for external electrode was applied and baked at a temperature of 800° C. in a $N_2$ atmosphere to form external electrodes that were electrically connected with the internal electrodes. In this manner, a laminated ceramic capacitor of Sample No. 1 was fabricated.

The outline dimension of the obtained laminated ceramic capacitor was 1.6 mm in length, 0.8 mm in width, and 1.0 mm in thickness, and the thickness of each dielectric layer was 0.7 μm. A total number of effective dielectric ceramic layers was 50, and the opposite electrode area per layer was 0.8 mm².

Sample No. 2

A laminated ceramic capacitor of Sample No. 2 was fabricated in a similar manner and procedure as in Sample No. 1 except that NiO was not added.

Sample No. 3

$BaCO_3$ and $TiO_2$ were prepared as ceramic base materials, and these ceramic base materials were weighed so that the blending molar ratio m between Ba and Ti was 1.010.

Next, these weighed materials were put into a ball mill together with PSZ balls and pure water, wet mixed and ground for 48 hours, and calcined at a temperature of 1100° C. to prepare a calcined powder.

Next, as additive materials, NiO, $Dy_2O_3$, $MnCO_3$, $MgCO_3$, and $SiO_2$ were prepared. Likewise to Sample No. 1, these additive materials were weighed so that the dielectric ceramic satisfied the above general formula (B).

These additive materials were put into a ball mill together with the calcined powder, wet mixed in the ball mill for 24 hours, and then dried by evaporation to obtain a ceramic material powder.

Then in a similar manner and procedure as in Sample No. 1, a laminated ceramic capacitor of Sample No. 3 was fabricated.

Structural Analysis of Ceramic Structure

In the cross sections of the laminated ceramic capacitors of Sample Nos. 1 to 3, the area percentage of the part where Ni was solid-solved in the crystal grains (hereinafter, referred to as "solid-solution area percentage") and the solid-solution area percentage of Dy were measured by TEM-EDX mapping analysis.

In brief, the entire crystal grain of an arbitrary crystal grain was scanned using a TEM-EDX having a probe of 2 nm, the region in the crystal grain where Ni was solid-solved was detected, and the area percentage where Ni was solid-solved was determined. At this time, a threshold of solid solution/nonsolid solution of Ni was 0.5 parts by mol relative to 100 parts by mol of the main ingredient. Also the solid-solution area percentage of Dy was determined in a similar measuring method.

This measurement was conducted for 20 crystal grains, and an average value was determined. For Ni, 80% or more was determined as "uniformly solid-solved". For Dy, quantitative values of the solid-solution area percentage are shown in Table 1.

TABLE 1

Composition formula: $100Ba_{1.010}TiO_3 + aNiO + 1.0DyO_{3/2} + 0.3MnO + 1.0MgO + 1.5SiO_2$

| Sample No. | a | Solid-solved state of Ni component | Solid-solution area percentage (%) of Dy component |
|---|---|---|---|
| 1 | 1.0 | Uniformly solid-solved | 8 |
| 2* | 0 | — | 26 |
| 3* | 1.0 | Not uniformly solid-solved | 20 |

*outside the scope of the present invention

As is apparent from Table 1, since the Ni in Sample No. 2 is not contained in the dielectric ceramic, the solid solution of the Dy component into the crystal grains was promoted, and the solid-solution area percentage was as large as 26%.

In Sample No. 3, the solid-solution area percentage of the Dy component was as large as 20% although Ni is contained in the dielectric ceramic. This is attributable to the fact that Ni is not uniformly solid-solved in the crystal grains because the NiO was not mixed with $BaCO_2$ and $TiO_2$ at the time of preparing the calcined powder but mixed after calcination, and hence the solid solution of the Dy component into the crystal grains is promoted.

On the other hand, since Ni is uniformly solid-solved in the crystal grains in Sample No. 1, the solid solution of the Dy component into the crystal grains was inhibited and the solid-solution area percentage could be suppressed to 10% or less as is evident from 8%.

Evaluation of Characteristics

The dielectric constant ∈, dielectric loss tan δ, AC voltage characteristics of capacitance, temperature characteristics of capacitance, withstand voltage, and reliability were evaluated.

Specifically, using an automated bridge-type measuring machine, capacitance C and dielectric loss tan δ were measured at a frequency of 1 kHz, an effective voltage of 0.5 Vrms and a temperature of 25° C., and a dielectric constant ∈ was calculated from capacitance C.

As for the AC voltage characteristics, capacitances $C_{0.5}$ and $C_{0.1}$ at effective voltages 0.5 Vrms, 0.1 Vrms at a frequency of 1 kHz and a temperature of 25° C. were measured. Based on the capacitance $C_{0.5}$ at 0.5 Vrms, the percentage of change in capacitance voltage $\Delta C_{0.1}/C_{0.5}$ at 0.1 Vrms was determined, and one showing a percentage of voltage change $\Delta C_{0.1}/C_{0.5}$ within ±8% was evaluated as a good article.

As for the temperature characteristics, a percentage change in capacitance by temperature ($\Delta C_{105}/C_{25}$) at +105° C., the maximum in the range of −55° C. to +105° C., was measured based on a capacitance at +25° C. One showing a percentage of change by temperature ($\Delta C_{105}/C_{25}$) within ±22% was determined as a good article because X6S characteristics of EIA standard were satisfied, and temperature characteristics were evaluated based on this.

As for the withstand voltage, voltage was applied on each sample, the applied voltage was elevated, and the voltage at which insulation breakage occurred was measured, and one showing an insulation breakage voltage of 100V or more was evaluated as a good article.

As for the reliability, a high temperature load test was conducted, and evaluation was made according to high temperature load life. In brief a DC voltage of 9.5 V was applied to 100 pieces of each sample at a high temperature of 105° C., and the time-dependent change in insulation resistance was measured. And after a lapse of 1000 hours and a lapse of 2000 hours from starting of the test, one whose insulation resistance decreased to 200 kΩ or less was determined as a defective article, the number of the defective articles was counted, and high temperature load life, namely reliability, was evaluated.

Table 2 shows measurement results of Sample Nos. 1 to 3.

TABLE 2

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant ∈ (−) | Dielectric loss tan δ (%) | Insulation breakage voltage (V) | Defective number in high temperature load test 1000 hours | 2000 hours |
|---|---|---|---|---|---|---|---|
| 1 | −6.0 | −17.5 | 3090 | 3.4 | 220 | 0/100 | 0/100 |
| 2* | −11.6 | −27.6 | 3260 | 3.8 | 200 | 1/100 | 3/100 |
| 3* | −9.2 | −22.5 | 3120 | 3.2 | 180 | 0/100 | 2/100 |

*outside the scope of the present invention

As is apparent from Table 1 and Table 2, the solid-solution area percentage of the Dy component was 26% being larger than 10% in Sample No. 2, the percentage of change in capacitance by voltage $\Delta C_{0.1}/C_{0.5}$ was 11.6% and could not be suppressed within ±8%, revealing that capacitance was unstable with respect to voltage change. In this case, the percentage of change in capacitance by temperature $\Delta C_{105}/C_{25}$ was −27.6% and could not be suppressed within ±22%, and the X6S characteristics of EIA standard were not satisfied. Also in the high temperature load test, three of 100 pieces were defective after a lapse of 2000 hours.

Also in Sample No. 3, the solid-solution area percentage of the Dy component is 20%, i.e., being larger than 10%, the percentage of change in capacitance by voltage $\Delta C_{0.1}/C_{0.5}$ was −9.2% and could not be suppressed within ±8%. Also the percentage of change in capacitance by temperature $\Delta C_{105}/C_{25}$ was −22.5% and could not be suppressed within ±22%, and the X6S characteristics of EIA standard were not satisfied. Also in the high temperature load test, two of 100 pieces were defective after a lapse of 2000 hours.

In contrast to this, the Sample No. 1 solid-solution area percentage of the Dy component is 8%, i.e., suppressed to 10% or less, the percentage of change in capacitance by voltage $\Delta C_{0.1}/C_{0.5}$ was −6.0%, i.e., within ±8%. Also the percentage of change in capacitance by temperature $\Delta C_{105}/C_{25}$ was −17.5%, and the X6S characteristics of EIA standard was satisfied. As to the high temperature load life, no defective article was present after a lapse of 2000 hours.

By uniformly solid-solving Ni in the crystal grains, it is possible to suppress the solid-solution area percentage of the Dy component to within 10% and thus to improve AC voltage characteristics of capacitance, and excellent results were obtained in terms of temperature characteristics of capacitance and reliability.

Example 2

Preparation of Sample

Samples Nos. 11 to 18

A ceramic material powder having the same composition as that in Sample No. 1 was prepared and a ceramic laminate was obtained.

Next, the ceramic laminate was subjected to a binder removing treatment at a temperature of 300° C., and each sample was subjected to a burning treatment which was conducted for about two hours under a reductive atmosphere of $H_2$—$N_2$—$H_2O$ gas whose oxygen partial pressure was controlled to $10^{-9}$ to $10^{-12}$ MPa at different temperatures ranging from 1140 to 1220° C. to obtain laminated ceramic capacitors of Sample Nos. 11 to 18.

Sample Nos. 19 to 26

Laminated ceramic capacitors of Sample Nos. 19 to 26 burnt at different temperatures were obtained in a similar manner and procedure as that in Sample Nos. 11 to 18 except that NiO was not added.

Structural Analysis of Ceramic Texture

For each sample of Sample Nos. 11 to 26, the structure of a ceramic texture was analyzed in a manner similar to Example 1, and the solid-solved state of a Ni component in the crystal grains was examined and a solid-solution area percentage of a Dy component was determined.

Table 3 shows the molar part a of Ni relative to 100 parts by mol of the main ingredient, the solid-solved state of the Ni component, the solid-solution area percentage of the Dy component, and the burning temperature for Sample Nos. 11 to 26.

TABLE 3

Composition formula: $100Ba_{1.010}TiO_3 + aNiO + 1.0DyO_{3/2} + 0.3MnO + 1.0MgO + 1.5SiO_2$

| Sample No. | a | Solid-solved state of Ni component | Solid-solution area percentage (%) of Dy component | Burning temperature (° C.) |
|---|---|---|---|---|
| 11 | 1.0 | Uniformly solid-solved | 2 | 1140 |
| 12 | 1.0 | Uniformly solid-solved | 4 | 1160 |
| 13 | 1.0 | Uniformly solid-solved | 5 | 1180 |
| 14 | 1.0 | Uniformly solid-solved | 6 | 1200 |
| 15 | 1.0 | Uniformly solid-solved | 8 | 1220 |
| 16 | 1.0 | Uniformly solid-solved | 10 | 1240 |
| 17* | 1.0 | Uniformly solid-solved | 16 | 1260 |
| 18* | 1.0 | Uniformly solid-solved | 21 | 1280 |
| 19* | 0 | — | 12 | 1140 |
| 20* | 0 | — | 16 | 1160 |
| 21* | 0 | — | 20 | 1180 |
| 22* | 0 | — | 23 | 1200 |
| 23* | 0 | — | 26 | 1220 |
| 24* | 0 | — | 31 | 1240 |
| 25* | 0 | — | 40 | 1260 |
| 26* | 0 | — | 52 | 1280 |

*outside the scope of the present invention

As the burning temperature increased, the solid-solution area percentage of the Dy component also increased. In other words, it was shown that by adjusting the burning temperature, the solid-solution area percentage of the Dy component can be finely adjusted.

Comparing Sample Nos. 11 to 18 in which Ni was uniformly solid-solved in the crystal grains, with Sample Nos. 19 to 26 not containing the Ni component, the solid-solution area percentage of the Dy component could be suppressed in each sample of Sample Nos. 11 to 18, compared with each corresponding sample of Sample Nos. 19 to 26. This is attributable to the fact that solid solution of the Dy component into the crystal grains becomes difficult as a result of uniform solid solution of the Ni component into the crystal grains.

Evaluation of Characteristics

For each sample of Sample Nos. 11 to 26, the dielectric constant ∈, dielectric loss tan δ, AC voltage characteristics of capacitance, temperature characteristics of capacitance, withstand voltage, and reliability were evaluated in a similar manner as in Example 1.

Table 4 shows the measurement results.

TABLE 4

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant ∈ (—) | Dielectric loss tanδ (%) | Insulation breakage voltage (V) | Defective number in high temperature load test 1000 hours | Defective number in high temperature load test 2000 hours |
|---|---|---|---|---|---|---|---|
| 11 | −5.8 | −16.2 | 3430 | 3.9 | 190 | 0/100 | 0/100 |
| 12 | −5.5 | −16.5 | 3320 | 3.4 | 190 | 0/100 | 0/100 |
| 13 | −5.1 | −16.9 | 3210 | 3.0 | 190 | 0/100 | 0/100 |
| 14 | −6.3 | −17.8 | 3120 | 4.0 | 190 | 0/100 | 0/100 |
| 15 | −6.0 | −17.5 | 3090 | 3.4 | 200 | 0/100 | 0/100 |
| 16 | −6.4 | −20.1 | 3010 | 3.2 | 200 | 0/100 | 0/100 |
| 17* | −10.3 | −23.5 | 2750 | 2.7 | 210 | 0/100 | 0/100 |
| 18* | −11.3 | −26.3 | 2590 | 2.5 | 210 | 0/100 | 0/100 |
| 19* | −8.2 | −22.6 | 3400 | 3.7 | 200 | 0/100 | 0/100 |
| 20* | −8.7 | −23.4 | 3340 | 3.6 | 200 | 0/100 | 0/100 |
| 21* | −9.8 | −24.2 | 3310 | 3.5 | 200 | 0/100 | 0/100 |
| 22* | −11.0 | −27.4 | 3210 | 3.7 | 200 | 0/100 | 2/100 |

TABLE 4-continued

| Sample No. | Percentage of change in capacitance by voltage ΔC$_{0.1}$/C$_{0.5}$ (%) | Percentage of change in capacitance by temperature ΔC$_{105}$/C$_{25}$ (%) | Dielectric constant ∈ (—) | Dielectric loss tanδ (%) | Insulation breakage voltage (V) | Defective number in high temperature load test 1000 hours | 2000 hours |
|---|---|---|---|---|---|---|---|
| 23* | −11.6 | −27.6 | 3260 | 3.8 | 200 | 0/100 | 3/100 |
| 24* | −15.2 | −26.5 | 3600 | 4.2 | 180 | 0/100 | 3/100 |
| 25* | −16.3 | −24.3 | 4210 | 4.8 | 120 | 3/100 | 15/100 |
| 26* | −19.6 | −23.5 | 4620 | 5.1 | 100 | 10/100 | 21/100 |

*outside the scope of the present invention

As is apparent from Table 3 and Table 4, the solid-solution area percentage of the Dy component are 16% and 21% in Sample Nos. 17 and 18, respectively, which exceed 10%, because of a high burning temperature, although Ni is uniformly solid-solved in the crystal grains. Therefore, the percentage change in capacitance by voltage ΔC$_{0.1}$/C$_{0.5}$ was as large as −10.3% and −11.3%, respectively, an absolute value exceeding 8%, and the temperature characteristics of capacitance no longer satisfied the X6S characteristics of EIA standard.

Also in Sample Nos. 19 to 26 where Ni is not present, the solid-solution area percentage of the Dy component was 12 to 52%, and the solid solution of the Dy component into the crystal grains could not be suppressed sufficiently. Therefore, the percentage change in capacitance by voltage ΔC$_{0.1}$/C$_{0.5}$ was −8.2 to −19.6, an absolute value exceeding 8%, and the temperature characteristics of capacitance no longer satisfied the X6S characteristics of EIA standard. In Sample Nos. 25 and 26 in which the solid-solution area percentage of the Dy component exceeded 40%, in particular, 15 or more of 100 pieces were defective after a lapse of 2000 hours in the high temperature load test, revealing that deterioration in reliability had been caused.

In contrast to this, the solid-solution area percentage of the Dy component in Sample Nos. 11 to 16 was suppressed to 2 to 10%, and it was possible to improve the percentage change in capacitance by voltage ΔC$_{0.1}$/C$_{0.5}$ to −5.8 to −6.4%. As for the percentage change in capacitance by temperature ΔC$_{105}$/C$_{25}$, an excellent result of −16.2 to −20.1%, which was within ±22%, was obtained, and the temperature characteristics of capacitance also satisfied the X6S characteristics of EIA standard. Further, no defective articles were formed even after a lapse of 2000 hours in the high temperature load test.

By blending the composition components as shown in Example 2, making Ni be uniformly solid-solved and adjusting the burning temperature, it is possible to suppress the solid-solution area percentage of the Dy component to within 10%. It was shown that in this manner the voltage characteristics of capacitance can be improved without impairing various characteristics such as the dielectric constant ∈, dielectric loss tan δ, insulation breakage voltage and temperature characteristics of capacitance, and reliability.

It was shown that in particular, the dielectric constant ∈ tends to decrease as the solid-solution area percentage of the Dy component decreases, however, excellent results are obtained for AC voltage characteristics of capacitance and temperature characteristics of capacitance.

Example 3

Preparation of Sample

As ceramic base materials, BaCO$_3$, TiO$_2$, and NiO were prepared, and these ceramic base materials were weighed so that the blending molar ratio m between Ba and Ti and the molar part a of NiO relative to 100 parts by mol of BaTiO$_3$ were the values as shown in Table 5, and a calcined powder was prepared in a similar manner and procedure as in Example 1.

Next, as additive materials, R oxides containing a rare earth element R (La$_2$O$_3$, CeO$_2$, Pr$_6$O$_{11}$, Nd$_2$O$_3$, Sm$_2$O$_3$, Eu$_2$O$_3$, Gd$_2$O$_3$, Tb$_2$O$_3$, Dy$_2$O$_3$, Ho$_2$O$_3$, Er$_2$O$_3$, Tm$_2$O$_3$, Yb$_2$O$_3$, Lu$_2$O$_3$, Y$_2$O$_3$), M oxides containing a metal element M (MnO, Fe$_2$O$_3$, CuO, CoO, V$_2$O$_5$, WO$_3$, Cr$_2$O$_3$, MoO$_2$, Al$_2$O$_3$), MgO, and SiO$_2$ were prepared.

Then these additive materials were weighed so that b, c, d and e in the following general formula (C) of the dielectric ceramic satisfied the values shown in Table 5.

$$100Ba_mTiO_3 + aNiO + bRO_n + cMO_v + dMgO + eSiO_2$$

Next, these additive materials were mixed with the calcined powder in a ball mill, and then dried by evaporation, to obtain a ceramic material powder.

Then laminated ceramic capacitors of Sample Nos. 31 to 58 were prepared in a similar manner and procedure as that in Example 1.

Structural Analysis of Ceramic Texture

Next, a structural analysis of a ceramic texture was conducted in a manner similar to Example 1 using a TEM-EDX, and solid-solved state of a Ni component was examined to reveal that the Ni component was uniformly solid-solved in the crystal grinds. Also the solid-solution area percentage of an R component was measured.

Table 5 shows component compositions and the solid-solution area percentages of the R component of each sample of Sample Nos. 31 to 58.

TABLE 5

Composition formula: $100Ba_mTiO_3 + aNiO + bRO_n + cMO_v + dMgO + eSiO_2$

| Sample No. | m | a | R | b | M | c | d | e | Solid-solution area percentage of R component (%) |
|---|---|---|---|---|---|---|---|---|---|
| 31 | 0.966 | 1.5 | Eu | 0.7 | Fe/V | 0.5 (0.4/0.1) | 0.7 | 1.3 | 8 |
| 32 | 1.009 | 3.0 | Pr/Er | 0.9 (0.4/0.5) | Ni/Al | 0.3 (0.1/0.2) | 1.3 | 0.5 | 8 |

TABLE 5-continued

Composition formula: $100Ba_mTiO_3 + aNiO + bRO_n + cMO_v + dMgO + eSiO_2$

| Sample No. | m | a | R | b | M | c | d | e | Solid-solution area percentage of R component (%) |
|---|---|---|---|---|---|---|---|---|---|
| 33 | 0.960 | 1.2 | Ce/Nd | 1.0 (0.2/0.8) | Mn/V | 0.4 (0.2/0.2) | 1.2 | 1.0 | 8 |
| 34 | 1.011 | 0.9 | Dy/Ho | 1.3 (0.6/0.7) | W/Fe | 0.5 (0.2/0.3) | 1.0 | 1.8 | 8 |
| 35 | 1.030 | 0.05 | Pr/Nd | 1.0 (0.3/0.7) | Cr/Al | 0.7 (0.3/0.4) | 0.9 | 0.8 | 7 |
| 36 | 1.010 | 1.9 | Er | 0.1 | Al/Cr | 0.4 (0.1/0.3) | 0.5 | 1.3 | 8 |
| 37 | 0.983 | 0.5 | Ce/Sm | 0.8 (0.3/0.5) | V/W | 0.5 (0.2/0.3) | 1.0 | 2.2 | 9 |
| 38 | 1.006 | 2.4 | Nd/Y | 1.5 (0.5/1.0) | Mn | 0.2 | 0.5 | 2.3 | 8 |
| 39 | 0.996 | 0.9 | La/Gd | 1.2 (0.3/0.9) | Al | 0.1 | 0.3 | 2.0 | 8 |
| 40 | 1.020 | 2.2 | Nd/Sm | 0.8 (0.2/0.6) | Mo | 0.3 | 1.2 | 3.2 | 8 |
| 41 | 0.978 | 1.3 | Tb/Ho | 0.9 (0.4/0.5) | Mn/Mo | 0.6 (0.3/0.3) | 1.4 | 2.5 | 8 |
| 42 | 1.006 | 1.9 | Tm/Y | 0.2 (0.1/0.1) | Mn | 0.1 | 0.1 | 2.3 | 9 |
| 43 | 1.015 | 1.5 | Ho/Eu/Y | 1.2 (0.2/0.3/0.7) | Mn/Al | 0.4 (0.2/0.2) | 0.8 | 3.0 | 7 |
| 44 | 0.998 | 2.8 | Ce/Lu | 0.7 (0.4/0.3) | Mn/Cr | 0.3 (0.2/0.1) | 1.5 | 1.4 | 8 |
| 45 | 1.005 | 1.5 | Dy/Lu | 0.3 (0.1/0.2) | Mn/Cu | 1.0 (0.4/0.6) | 0.9 | 0.7 | 8 |
| 46 | 0.971 | 0.9 | Dy/Er | 1.5 (0.7/0.8) | Mn/Co | 0.4 (0.1/0.3) | 1.1 | 0.1 | 8 |
| 47 | 1.010 | 1.0 | Lu/Dy | 0.5 (0.1/0.4) | V | 0.2 | 1.4 | 3.5 | 8 |
| 48** | 1.018 | 3.2 | La/Ce | 1.2 (0.3/0.9) | W/Mn | 0.2 (0.1/0.1) | 0.5 | 1.0 | 5 |
| 49* | 0.958 | 1.2 | Eu/Pr | 0.5 (0.2/0.3) | Mn/W | 0.4 (0.2/0.2) | 1.2 | 1.5 | 22 |
| 50** | 1.032 | 2.3 | Yb/Y | 1.0 (0.5/0.5) | Mn | 0.3 | 1.0 | 2.2 | 4 |
| 51* | 1.011 | 1.8 | Dy | 0.08 | V/Mo | 0.3 (0.1/0.2) | 1.5 | 2.5 | 25 |
| 52** | 1.006 | 0.2 | La/Ho | 1.8 (1.0/0.8) | Mn/Mo | 0.5 (0.2/0.3) | 1.1 | 0.8 | 5 |
| 53** | 1.018 | 1.2 | Yb/Y | 1.1 (0.2/0.9) | — | 0 | 1.4 | 1.2 | 10 |
| 54** | 1.006 | 2.8 | Gd/Ho | 1.4 (0.5/0.9) | Mn/V | 1.1 (0.5/0.6) | 0.9 | 3.0 | 5 |
| 55* | 0.966 | 1.5 | La/Pr | 1.3 (0.5/0.8) | Mn/Fe | 0.4 (0.3/0.1) | 0.0 | 0.5 | 52 |
| 56** | 1.002 | 0.5 | Tm/Yb | 1.3 (0.2/1.1) | Fe/Al | 0.5 (0.3/0.2) | 2.0 | 2.0 | 4 |
| 57** | 1.010 | 1.5 | Dy | 1.0 | Mn | 0.3 | 1.0 | 0.0 | 2 |
| 58* | 1.010 | 2.5 | Dy | 1.0 | Mn | 0.3 | 1.0 | 3.8 | 37 |

*outside the scope of the present invention
**outside the preferred scope of the present invention In Sample Nos. 49, 51, 55 and 58, the solid solution area percentage of the R component exceeded 10% in each case, and thus is outside the scope of the present invention.

The solid-solution area percentage of the R component exceeding 10% in Sample No. 49 is attributable to the fact that Ni is solid-solved in the crystal grains, but the blending molar ratio m is 0.958 and the main ingredient is overly site B excess (Ti excess). The solid-solution area percentage of the R component exceeding 10% in Sample No. 51 is attributable to the fact that the R component (Dy) diffuses in a wide area at a low concentration. The solid-solution area percentage of the R component exceeding 10% in Sample No. 55 is attributable to the fact that an appropriate amount of MgO is not present. Further, the solid-solution area percentage of the R component exceeding 10% in Sample No. 58 is attributable to the fact a content of $SiO_2$, which is a sintering aid, is too high.

To the contrary, the contents of additives in Sample Nos. 31 to 48, 50, 52 to 54, 56 and 57 are appropriately, and thus the solid-solution area percentage of the R component could be suppressed to within 10%.

Comparing Sample No. 51 whose molar part b of the R component is 0.08 with Sample No. 52 whose molar part b of the R component is 1.8, the solid-solution area percentage of the former is much larger than that of the latter although the molar part b of the former is smaller than that of the latter. This is because the R component in the latter is in a relatively large concentration and is locally scattered, while the R component in the former is in a low concentration and diffused in a relatively wide range of crystal grains.

Evaluation of Characteristics

For each sample of Sample Nos. 31 to 58, the dielectric constant ∈, dielectric loss tan δ, AC voltage characteristics of capacitance, temperature characteristics of capacitance, withstand voltage, and reliability were evaluated in a manner similar to Example 1.

Table 6 shows the measurement results.

TABLE 6

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant $\in$ (−) | Dielectric loss tan δ (%) | Insulation breakage voltage (V) | Defective number in high temperature load test 1000 hours | 2000 hours |
|---|---|---|---|---|---|---|---|
| 31 | −6.5 | −19.9 | 3390 | 3.8 | 230 | 0/100 | 0/100 |
| 32 | −7.2 | −21.8 | 3620 | 4.1 | 250 | 0/100 | 0/100 |
| 33 | −7.2 | −21.5 | 3580 | 4.2 | 230 | 0/100 | 0/100 |
| 34 | −6.4 | −20.3 | 3260 | 3.6 | 180 | 0/100 | 0/100 |
| 35 | −6.3 | −18.6 | 3010 | 2.4 | 160 | 0/100 | 0/100 |
| 36 | −6.8 | −20.5 | 3210 | 3.8 | 260 | 0/100 | 0/100 |
| 37 | −6.2 | −21.7 | 3690 | 5.4 | 130 | 0/100 | 0/100 |
| 38 | −5.3 | −20.3 | 3280 | 4.6 | 250 | 0/100 | 0/100 |
| 39 | −7.2 | −20.3 | 3140 | 4.2 | 120 | 0/100 | 0/100 |
| 40 | −7.3 | −20.8 | 3340 | 4.5 | 150 | 0/100 | 0/100 |
| 41 | −7.5 | −21.1 | 3610 | 4.9 | 160 | 0/100 | 0/100 |
| 42 | −7.9 | −20.3 | 3820 | 5.0 | 220 | 0/100 | 0/100 |
| 43 | −7.2 | −18.5 | 2980 | 3.4 | 240 | 0/100 | 0/100 |
| 44 | −4.2 | −21.5 | 3490 | 3.9 | 180 | 0/100 | 0/100 |
| 45 | −5.3 | −20.3 | 3040 | 2.9 | 240 | 0/100 | 0/100 |
| 46 | −6.1 | −21.2 | 3290 | 3.6 | 190 | 0/100 | 0/100 |
| 47 | −6.5 | −20.5 | 3490 | 4.5 | 220 | 0/100 | 0/100 |
| 48** | −5.1 | −18.6 | 3105 | 4.1 | 90 | 1/100 | 6/100 |
| 49* | −12.3 | −25.2 | 3950 | 6.3 | 120 | 8/100 | 32/100 |
| 50** | −6.2 | −22.1 | 2020 | 2.9 | 210 | 0/100 | 0/100 |
| 51* | −13.6 | −21.6 | 4060 | 5.8 | 90 | 5/100 | 39/100 |
| 52** | −5.3 | −23.1 | 2320 | 3.1 | 200 | 0/100 | 0/100 |
| 53** | −6.8 | −16.5 | 3280 | 5.6 | 70 | 0/100 | 9/100 |
| 54** | −7.2 | −20.1 | 2130 | 5.3 | 110 | 0/100 | 4/100 |
| 55* | −9.8 | −21.8 | 5150 | 12.4 | 120 | 9/100 | 34/100 |
| 56** | −5.4 | −24.5 | 2520 | 3.2 | 180 | 0/100 | 0/100 |
| 57** | −7.1 | −20.0 | 1820 | 4.2 | 60 | 0/100 | 2/100 |
| 58* | −11.2 | −26.3 | 4620 | 4.9 | 90 | 0/100 | 0/100 |

*outside the scope of the present invention
**outside the preferred scope of the present invention As is apparent from Table 5 and Table 6, since the solid-solution area percentage of the R component in Sample Nos. 49, 51, 55 and 58 exceeds 10%, the percentage of change in capacitance by voltage $\Delta C_{0.1}/C_{0.5}$ was −9.8 to −13.6%, and the absolute value exceeded 8%, and AC voltage characteristics could not be improved.

In particular, 5 to 9 of 100 pieces in Sample Nos. 49, 51 and 55 were defective after a lapse of 1000 hours in the high temperature load test, and 32 to 34 of 100 pieces were defective after a lapse of 2000 hours, revealing that significant deterioration in reliability. Also in Sample No. 49 in which site B is excess, and Sample No. 58 in which the sintering aid is excessively added, the temperature characteristics of capacitance deteriorated, and the X6S characteristics of EIA standard was no longer satisfied.

On the other hand, since the solid-solution area percentage of the R component is 10% or less in Sample Nos. 48, 50, 52 to 54, 56, 57, the percentage of change in capacitance by voltage $\Delta C_{0.1}/C_{0.5}$ was −5.1 to −7.1%, and could thus be suppressed within ±8%.

In Sample No. 48, NiO is contained in an amount of 3.2 parts by mol being larger than 3 parts by mol relative to 100 parts by mol of the main ingredient, and the insulation breakage voltage decreased to 90V and the withstand voltage deteriorated, and also in the high temperature load test, 6 of 100 pieces were defective after a lapse of 2000 hours, showing a reduction in reliability.

In Sample No. 50, the blending molar ratio m between Ba and Ti is 1.032 and is overly site A excess, and the dielectric constant $\in$ decreased to 2020, the percentage of change in capacitance by temperature $\Delta C_{105}/C_{25}$ was −22.1%, and the temperature characteristics deteriorated and the X6S characteristics of EIA standard was no longer satisfied.

In Sample No. 52, where the total contained molar amount of the R component is 1.8 parts by mol relative to 100 parts by mol of the main ingredient and exceeds 1.5 parts by mol, the dielectric constant $\in$ decreased to 2320, the percentage of change in capacitance by temperature $\Delta C_{105}/C_{25}$ was −23.1%, and temperature characteristics deteriorated and the X6S characteristics of EIA standard was no longer satisfied.

In Sample No. 53, where no metal element M is contained; the insulation breakage voltage decreased to 70V, and 9 of 100 pieces were defective after a lapse of 2000 hours in the high temperature load test.

In Sample No. 54, where the total molar amount of the metal element M is 1.1 parts by mol relative to 100 parts by mol of the main ingredient and exceeds 1.0 part by mol, the dielectric constant $\in$ was as low as 2130, and 4 of 100 pieces were defective after a lapse of 2000 hours in the high temperature load test.

In Sample No. 56, the molar amount of MgO is 2.0 parts by mol relative to 100 parts by mol of the main ingredient and exceeds 1.5 parts by mol, and the percentage change in capacitance by the temperature $\Delta C_{105}/C_{25}$(%) was −24.5%, and temperature characteristics deteriorated and the X6S characteristics of EIA standard was no longer satisfied.

In Sample No. 57, where no sintering aid is contained, sinterability decreased, both of the dielectric constant $\in$ and insulation breakage voltage were extremely low (1820 and 60V, respectively), and 2 of 100 pieces were defective after a lapse of 2000 hours in the high temperature load test.

In Sample Nos. 31 to 47, where the solid-solution area percentage of the R component is suppressed within 10%, the blending molar ratio m satisfies 0.96≦m≦1.030, and the molar part a of NiO, the molar part b of $RO_n$, the molar part c of $MO_v$, the molar part d of MgO and the molar part e of $SiO_2$ relative to 100 parts by mol of the main ingredient are within the appropriate ranges 0.05≦a≦3, 0.1≦b≦1.5, 0.1≦c≦1.0, 0.1≦d≦1.5, and 005≦e≦3.5, respectively, the percentage change in capacitance by voltage $\Delta C_{0.1}/C_{0.5}$ was improved to within ±8%, the dielectric constant ∈ had a high dielectric constant ranging from 2980 to 3620, the temperature characteristics of capacitance satisfied the X6S characteristics of EIA standard, 100 V or higher insulation breakage voltage was ensured, and no defective article was present after a lapse of 2000 hours in the high temperature load test.

This Example 3 result demonstrates that by suppressing the solid-solution area percentage of the R component to within 10%, the AC voltage characteristics of capacitance can be improved, but when the contents of the additives are outside appropriate ranges, deterioration occurs the dielectric constant ∈, temperature characteristics of capacitance, withstand voltage and/or reliability, whereas by making the contents of the additives fall within appropriate ranges, it is possible to improve AC voltage characteristics of capacitance without impairing various characteristics such as dielectric characteristics, temperature characteristics of capacitance, withstand voltage, reliability and the like.

Example 4

Preparation of Sample

As ceramic base materials, $BaCO_3$, $SrCO_3$, $CaCO_3$, $TiO_2$, $ZrO_2$, $HfO_2$, and NiO were prepared, predetermined amounts of these ceramic base materials were weighed, and a calcined powder was prepared in a similar manner and procedure as in Example 1.

Next, as additive materials, R oxide, M oxide, MgO and $SiO_2$ similar to those in Example 3 were prepared.

Then these additive materials were weighed so that the dielectric ceramic satisfied the following general formula (D).

$$100A_mBO_3 + aNiO + bRO_n + cMO_v + dMgO + eSiO_2$$

Here, A represents Ba, and Sr and/or Ca, and B represents Ti, and Zr and/or Hf.

Next, these additive materials were mixed with the calcined powder in a ball mill, and dried by evaporation to obtain a ceramic material powder.

Thereafter, laminated ceramic capacitors of Sample Nos. 61 to 76 were fabricated in a fabrication method similar to Example 1.

[Structural Analysis of Ceramic Texture]

For Sample Nos. 61 to 76, a structural analysis of a ceramic texture was conducted in a manner similar to Example 1 using a TEM-EDX, and the solid-solved state of a Ni component was examined to reveal that the Ni component was uniformly solid-solved in the crystal grinds. Also a solid-solution area percentage of an R component was measured to reveal that it was within 10%.

Evaluation of Characteristics

For each of Sample Nos. 61 to 76, the dielectric constant ∈, dielectric loss tan δ, AC voltage characteristics of capacitance, temperature characteristics of capacitance, withstand voltage, and reliability were evaluated in manner similar to Example 1.

Table 7 shows a component composition of each sample of Sample Nos. 61 to 76, and Table 8 shows measurement results of various characteristics.

TABLE 7

Composition formula: $100A_mBO_3 + aNiO + bRO_n + cMO_v + dMgO + eSiO_2$

| Sample No. | site A Replacing element | site A Replaced molar amount (% by mol) | site B Replacing element | site B Replaced molar amount (% by mol) | m | a | R | b | M | c | d | e |
|---|---|---|---|---|---|---|---|---|---|---|---|---|
| 61 | — | — | — | — | 1.010 | 1.0 | Dy | 1.0 | Mn | 0.3 | 1.0 | 1.0 |
| 62 | Ca | 0.5 | — | — | 0.996 | 2.0 | La | 1.0 | V/Mn | 0.4 (0.3/0.1) | 1.5 | 1.3 |
| 63 | Ca/Sr | 2.2 (2/0.2) | — | — | 1.025 | 2.2 | La/Er | 1.0 (0.5/0.5) | Mn | 0.5 | 1.2 | 3.0 |
| 64 | Ca/Sr | 5 (4.5/0.5) | — | — | 0.989 | 0.5 | Pr | 0.9 | Fe/V | 0.4 (0.3/0.1) | 0.9 | 1.1 |
| 65 | Ca | 8.5 | — | — | 1.005 | 0.4 | Eu | 0.5 | W/V | 0.5 (0.4/0.1) | 1.0 | 0.6 |
| 66 | — | — | Zr | 0.5 | 1.009 | 2.0 | Nd/Ho | 1.0 (0.8/0.2) | Mn/Al | 0.4 (0.2/0.2) | 1.4 | 0.8 |
| 67 | — | — | Zr/Hf | 2.2 (2/0.2) | 1.008 | 1.5 | Ce/La | 1.4 (1.2/0.2) | Mn/V | 0.4 (0.2/0.2) | 0.8 | 1.1 |
| 68 | — | — | Zr/Hf | 5 (4.5/0.5) | 1.010 | 0.8 | Sm/Tb | 0.8 (0.5/0.3) | W/Al | 0.5 (0.3/0.2) | 0.5 | 0.9 |
| 69 | Ca | 2 | Zr | 2 | 0.996 | 0.1 | Lu/Gd | 0.6 (0.3/0.3) | Al | 0.4 | 0.5 | 1.2 |
| 70 | Ca/Sr | 2.2 (2/0.2) | Zr | 0.5 | 1.008 | 1.2 | Er | 0.1 | Cr/Fe | 0.7 (0.6/0.1) | 0.1 | 0.6 |
| 71 | Ca/Sr | 2.7 (2.5/0.2) | Zr/Hf | 5.3 (5/0.3) | 0.986 | 1.8 | Sm/Ce | 1.5 (1.2/0.3) | Al/Fe | 0.4 (0.3/0.1) | 1.2 | 0.4 |
| 72 | Ca/Sr | 4 (3.9/0.1) | Zr | 3 | 1.020 | 3.0 | Nd/Y | 1.5 (0.5/1.0) | Cu | 0.6 | 1.4 | 2.0 |
| 73 | Ca | 5.5 | Zr/Hf | 4 (3.5/0.5) | 0.996 | 0.9 | Dy | 1.2 | V | 0.4 | 0.8 | 1.2 |
| 74 | Ca/Sr | 8 (7.5/0.5) | Zr/Hf | 1.3 (1/0.3) | 1.009 | 1.9 | Tm/Y | 1.1 (0.8/0.3) | W/V | 0.4 (0.3/0.1) | 1.3 | 2.3 |

TABLE 7-continued

Composition formula: $100A_mBO_3 + aNiO + bRO_n + cMO_v + dMgO + eSiO_2$

| | site A | | site B | | | | | | | | | |
|---|---|---|---|---|---|---|---|---|---|---|---|---|
| Sample No. | Replacing element | Replaced molar amount (% by mol) | Replacing element | Replaced molar amount (% by mol) | m | a | R | b | M | c | d | e |
| 75 | Ca/Sr | 8.5 (8.2/0.3) | Zr | 4 | 1.030 | 2.4 | Tb/Ce | 0.6 (0.5/0.1) | Al/V | 0.4 (0.3/0.1) | 1.4 | 0.1 |
| 76 | Ca/Sr | 10 (9.7/0.3) | Zr/Hf | 2.7 (2.2/0.5) | 1.009 | 1.1 | Pr/Ho | 0.8 (0.7/0.1) | W/Al | 0.5 (0.3/0.2) | 0.7 | 0.7 |

TABLE 8

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant $\in$ (−) | Dielectric loss tan$\delta$ (%) | Insulation breakage voltage (V) | Defective number in high temperature load test | |
|---|---|---|---|---|---|---|---|
| | | | | | | 1000 hours | 2000 hours |
| 61 | −6.0 | −17.5 | 3090 | 3.4 | 200 | 0/100 | 0/100 |
| 62 | −7.1 | −18.2 | 3120 | 3.5 | 200 | 0/100 | 0/100 |
| 63 | −7.3 | −17.9 | 3080 | 3.5 | 190 | 0/100 | 0/100 |
| 64 | −7.9 | −19.1 | 3150 | 3.4 | 170 | 0/100 | 0/100 |
| 65 | −7.5 | −18.8 | 3010 | 3.1 | 180 | 0/100 | 0/100 |
| 66 | −7.3 | −16.9 | 2960 | 3.6 | 190 | 0/100 | 0/100 |
| 67 | −7.5 | −17.2 | 3070 | 3.0 | 200 | 0/100 | 0/100 |
| 68 | −7.8 | −18.3 | 3120 | 3.2 | 210 | 0/100 | 0/100 |
| 69 | −6.9 | −19.1 | 3210 | 3.6 | 170 | 0/100 | 0/100 |
| 70 | −6.9 | −19.6 | 3000 | 3.6 | 180 | 0/100 | 0/100 |
| 71 | −7.2 | −17.9 | 3400 | 3.9 | 190 | 0/100 | 0/100 |
| 72 | −6.8 | −17.1 | 3210 | 3.6 | 180 | 0/100 | 0/100 |
| 73 | −7.6 | −20.1 | 3690 | 4.0 | 190 | 0/100 | 0/100 |
| 74 | −7.9 | −19.3 | 3460 | 4.1 | 190 | 0/100 | 0/100 |
| 75 | −7.2 | −18.4 | 3100 | 3.7 | 180 | 0/100 | 0/100 |
| 76 | −7.6 | −16.3 | 2970 | 3.1 | 190 | 0/100 | 0/100 |

As is apparent from Table 7 and Table 8, even if a part of Ba constituting site A is replaced by Sr and/or Ca, or even when a part of Ti constituting site B is replaced by Zr and/or Hf, it was possible to suppress the percentage of change in capacitance by voltage $\Delta C_{0.1}/C_{0.5}$ to within ±8% and to make the percentage change in capacitance by temperature $\Delta C_{105}/C_{25}$ to within ±22%, like the case where site A was composed only by Ba and site B was composed only by Ti, and further, the dielectric constant $\in$ could be made 2800 or more, and also in the high temperature load test, the number of defective articles could be made 0 after a lapse of 2000 hours. In other words, by making Ni component be uniformly solid-solved into the crystal grains to suppress the solid-solution area percentage of the R component within 10% and keep a blending molar ratio m between site A and site B and contained molar amounts of various additives within appropriate ranges, it is possible to realize a laminated ceramic capacitor excellent in dielectric characteristics, temperature characteristics, withstand voltage and reliability as well as AC voltage characteristics, even if a part of Ba is replaced by Ca and/or Sr or a part of Ti is replaced by Zr and/or Hf.

Example 5

Preparation of Sample

A calcined powder similar to Sample No. 1 of Example 1 was prepared.

Next, as additive materials, in addition to $Dy_2O_3$, MnO, and MgO, $SiO_2$, $TiO_2$, $Li_2O$, NaO, $B_2O_3$, $K_2O$ and MgO were prepared as X oxides containing a sintering aid component X.

These additive materials were weighed so that the dielectric ceramic was represented by the following general formula (E).

$100Ba_{1.010}TiO_3 + 1.0NiO + 1.0DyO_{2/3} + 0.3MnO + 1.0MgO + eXO_w$

Next, these additive materials were mixed with the calcined powder in a ball mill, and dried by evaporation to obtain a ceramic material powder.

Thereafter, laminated ceramic capacitors of Sample Nos. 81 to 87 were fabricated in a similar fabrication method to Example 1.

Structural Analysis of Ceramic Texture

For Sample Nos. 81 to 87, a structural analysis of a ceramic texture was conducted in a similar manner to Example 1 using a TEM-EDX, and the solid-solved state of a Ni component was examined to reveal that the Ni component was uniformly solid-solved in the crystal grinds. Also a solid-solution area percentage of an R component was measured, to reveal that it was within 10%.

Evaluation of Characteristics

For each of Sample Nos. 81 to 87, the dielectric constant $\in$, dielectric loss tan δ, AC voltage characteristics of capacitance, temperature characteristics of capacitance, withstand voltage, and reliability were evaluated in a similar manner to Example 1.

Table 9 shows kinds of the sintering aid component X in Sample Nos. 81 to 87 and the molar part e relative to 100 parts by mol of the main ingredient, and Table 10 shows measurement results of various characteristics.

TABLE 9

| Sample No. | Composition formula: $100Ba_{1.010}TiO_3 + 1.0NiO + 1.0DyO_{3/2} + 0.3MnO + 1.0MgO + eXO_w$ | |
|---|---|---|
| | X | e |
| 81 | Si | 1.0 |
| 82 | Si/Ti | 0.5 |
| | | (0.25/0.25) |
| 83 | Si/Li | 1.3 |
| | | (1.0/0.3) |
| 84 | Si/Li/Na | 2.9 |
| | | (2.1/0.4/0.4) |
| 85 | Si/B | 0.1 |
| | | (0.05/0.05) |
| 86 | Si/B/K | 2.3 |
| | | (1.5/0.5/0.3) |
| 87 | Si/Mg | 0.3 |
| | | (0.2/0.1) |

TABLE 10

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant $\in$ (-) | Dielectric loss tan δ (%) | Insulation breakage voltage (V) | Defective number in high temperature load test | |
|---|---|---|---|---|---|---|---|
| | | | | | | 1000 hours | 2000 hours |
| 81 | −7.2 | −18.5 | 3010 | 3.3 | 200 | 0/100 | 0/100 |
| 82 | −7.1 | −18.3 | 3120 | 3.5 | 190 | 0/100 | 0/100 |
| 83 | −6.9 | −17.9 | 3020 | 3.2 | 200 | 0/100 | 0/100 |
| 84 | −7.0 | −18.9 | 3040 | 3.3 | 190 | 0/100 | 0/100 |
| 85 | −7.8 | −19.0 | 3150 | 3.6 | 200 | 0/100 | 0/100 |
| 86 | −7.5 | −17.8 | 3090 | 3.2 | 200 | 0/100 | 0/100 |
| 87 | −7.3 | −18.0 | 3100 | 3.1 | 180 | 0/100 | 0/100 |

As is apparent from Table 9 and Table 10, even if a sintering aid added with a component in addition to a Si component is used, as is Sample Nos. 82 to 87, it is possible to suppress the percentage change in capacitance by voltage $\Delta C_{0.1}/C_{0.5}$ to within ±8% and to make the percentage change in capacitance by temperature $\Delta C_{105}/C_{25}$ to within ±22%, and the dielectric constant $\in$ can be made 2800 or more, and also in the high temperature load test, the number of defective articles can be made 0 after a lapse of 2000 hours. In other words, by making the Ni component be uniformly solid-solved into the crystal grains to make the solid-solution area percentage of the R component within 10% and keep a blending molar ratio m between site A and site B and contained molar amounts of various additives within appropriate ranges, it is possible to realize a laminated ceramic capacitor excellent in dielectric characteristics, temperature characteristics, withstand voltage and reliability as well as AC voltage characteristics, even if another sintering assistant component is contained in addition to Si.

Example 6

Preparation of Sample

Laminated ceramic capacitors of Examples 91 to 97 were prepared in a similar fabrication method as in Sample No. 1 of Example 1 except that the predetermined molar amount of a specific impurity component shown in Table 11 relative to 100 parts by mol of the main ingredient was intentionally contained.

Structural Analysis of Ceramic Texture

For Sample Nos. 91 to 97, a structural analysis of a ceramic texture was conducted in a similar manner to Example 1 using a TEM-EDX, and the solid-solved state of a Ni component was examined, to reveal that the Ni component was uniformly solid-solved in the crystal grinds. Also a solid-solution area percentage of an R component was measured, to reveal that it was within 10%.

Evaluation of Characteristics

For each of Sample Nos. 91 to 97, the dielectric constant $\in$, dielectric loss tan δ, AC voltage characteristics of capacitance, temperature characteristics of capacitance, withstand voltage, and reliability were evaluated in a similar manner as in Example 1.

Table 11 shows the kind of the impurity component and molar amount relative to 100 parts by mol of the main ingredient, in Sample Nos. 91 to 97, and Table 12 shows measurement results of various characteristics.

TABLE 11

| Sample No. | Impurity component | Molar amount, relative to 100 parts of main ingredient |
|---|---|---|
| 91 | Zr/Zn/Ag | 0.52 |
| | | (0.5/0.01/0.01) |
| 92 | Zr/Pd | 0.21 |
| | | (0.2/0.01) |
| 93 | Zr/Hf/Ag | 0.37 |
| | | (0.3/0.05/0.02) |
| 94 | Zr/Ag/Sr | 0.97 |
| | | (0.8/0.1/0.07) |
| 95 | Zr/Zn | 0.15 |
| | | (0.1/0.05) |
| 96 | Zr/Hf/Pd | 0.74 |
| | | (0.7/0.03/0.01) |
| 97 | Pd/Zn/Na | 0.63 |
| | | (0.6/0.02/0.01) |

TABLE 12

| Sample No. | Percentage of change in capacitance by voltage $\Delta C_{0.1}/C_{0.5}$ (%) | Percentage of change in capacitance by temperature $\Delta C_{105}/C_{25}$ (%) | Dielectric constant ∈ (-) | Dielectric loss tanδ (%) | Insulation breakage voltage (V) | Defective number in high temperature load test | |
|---|---|---|---|---|---|---|---|
| | | | | | | 1000 hours | 2000 hours |
| 91 | −7.2 | −18.6 | 3120 | 3.2 | 170 | 0/100 | 0/100 |
| 92 | −7.1 | −18.5 | 3080 | 3.6 | 180 | 0/100 | 0/100 |
| 93 | −6.9 | −18.3 | 3050 | 3.4 | 200 | 0/100 | 0/100 |
| 94 | −6.5 | −17.9 | 3120 | 3.3 | 180 | 0/100 | 0/100 |
| 95 | −6.0 | −19.1 | 3140 | 3.3 | 190 | 0/100 | 0/100 |
| 96 | −7.5 | −19.3 | 3000 | 3.2 | 190 | 0/100 | 0/100 |
| 97 | −6.2 | −18.0 | 3090 | 3.0 | 190 | 0/100 | 0/100 |

As is apparent from Table 11 and Table 12, it is possible to suppress the percentage of change in capacitance by voltage $\Delta C_{0.1}/C_{0.5}$ within ±8% and to make the percentage of change in capacitance by temperature $\Delta C_{105}/C_{25}$ within ±22%, and the dielectric constant ∈ can be made 2800 or more, and also in the high temperature load test, the number of defective article can be made 0 after a lapse of 2000 hours even if a trace of impurities is contained in the dielectric ceramic. That is, it was found that even if a trace of impurities is contained in the dielectric ceramic, it will not influence on various characteristics.

The invention claimed is:

1. A dielectric ceramic comprising a perovskite compound represented by the general formula $ABO_3$ in which A is Ba or Ba in combination with at least one of Ca and Sr, and B is Ti or Ti in combination with at least one of Zr and Hf as a main ingredient, a rare earth element R which is at least one member selected from the group consisting of La, Ce, Pr, Nd, Sm, Eu, Gd, Tb, Dy, Ho, Er, Tm, Yb, Lu and Y, and Ni, and having crystal grains and crystal grain boundaries,
wherein said Ni is uniformly or substantially uniformly solid-solved in the crystal grains, and an average solid-solution region of said rare earth element R in a cross section of said crystal grains is 10% or less.

2. The dielectric ceramic according to claim 1, wherein said composition is represented by a general formula:

$100A_mBO_3+aNiO+bRO_n+cMO_v+dMgO+eXO_w$ wherein M is at least one metal element selected from the group consisting of Mn, Fe, Cu, Co, V, W, Cr, Mo and Al, and X is a sintering aid component comprising Si; n, v and w respectively represent positive numbers determined depending on valences of said rare earth element R, said metal element M, and said sintering aid component X, respectively; and $0.96 \leq m \leq 1.030$, $0.05 \leq a \leq 3$, $0.1 \leq b \leq 1.5$, $0.1 \leq c \leq 1.0$, $0.1 \leq d \leq 1.5$, and $0.05 \leq e \leq 3.5$.

3. The dielectric ceramic according to claim 2 wherein A is Ba and B is Ti.

4. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 3.

5. The dielectric ceramic according to claim 2, wherein A is Ba and at least one of Ca and Sr.

6. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 5.

7. The dielectric ceramic according to claim 2, wherein B is Ti and at least one of Zr and Hr.

8. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 7.

9. The dielectric ceramic according to claim 2, wherein R comprises Dy.

10. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 9.

11. The dielectric ceramic according to claim 2, wherein $0.9 \leq a \leq 2.8$, $0.2 \leq b \leq 1.2$, $0.2 \leq c \leq 0.7$, $0.3 \leq d \leq 1.4$, and $0.1 \leq e \leq 3$.

12. The dielectric ceramic according to claim 11 wherein the average solid-solution region of said rare earth element R in a cross section of said crystal grains is 9% or less.

13. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 12.

14. The dielectric ceramic according to claim 11 wherein A is Ba and B is Ti.

15. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode,
wherein said dielectric layer is a dielectric ceramic according to claim 14.

16. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode, wherein said dielectric layer is a dielectric ceramic according to claim 11.

17. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode, wherein said dielectric layer is a dielectric ceramic according to claim 2.

18. The dielectric ceramic according to claim 1 wherein A is Ba and B is Ti.

19. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode, wherein said dielectric layer is a dielectric ceramic according to claim 18.

20. A laminated ceramic capacitor having a ceramic sintered body comprising alternately stacked dielectric layers and internal electrode layers, a pair of external electrodes at different points on a surface of the ceramic sintered body, and each external electrode being electrically connected to a different internal electrode, wherein said dielectric layer is a dielectric ceramic according to claim 1.

* * * * *